(12) United States Patent
Chen

(10) Patent No.: US 11,341,023 B2
(45) Date of Patent: May 24, 2022

(54) APPARATUS, METHOD, AND NON-TRANSITORY COMPUTER-READABLE MEDIUM FOR ANALYZING TRACE INFORMATION

(71) Applicant: ALIBABA GROUP HOLDING LIMITED, George Town (KY)

(72) Inventor: Jian Chen, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 597 days.

(21) Appl. No.: 16/293,562

(22) Filed: Mar. 5, 2019

(65) Prior Publication Data

US 2020/0285557 A1    Sep. 10, 2020

(51) Int. Cl.
   *G06F 11/34*    (2006.01)

(52) U.S. Cl.
   CPC ...... *G06F 11/3471* (2013.01); *G06F 11/3414* (2013.01); *G06F 11/3461* (2013.01)

(58) Field of Classification Search
   None
   See application file for complete search history.

(56) References Cited

U.S. PATENT DOCUMENTS

| | | | | |
|---|---|---|---|---|
| 5,894,575 A * | 4/1999 | Levine | ............. | G06F 11/3636 717/128 |
| 6,006,033 A * | 12/1999 | Heisch | ............. | G06F 8/445 711/125 |
| 6,223,338 B1 * | 4/2001 | Smolders | ............. | G06F 11/3466 714/E11.192 |
| 7,454,666 B1 * | 11/2008 | Jordan | ............. | G06F 11/3636 712/227 |
| 8,032,710 B1 * | 10/2011 | Ashcraft | ............. | G06F 9/3808 711/133 |
| 2005/0055696 A1 * | 3/2005 | Betzler | ............. | G06F 9/5088 718/100 |
| 2006/0212761 A1 * | 9/2006 | Levine | ............. | G06F 11/348 714/45 |
| 2008/0022285 A1 * | 1/2008 | Cherkasova | ............. | G06F 9/505 718/104 |
| 2008/0270595 A1 * | 10/2008 | Rolia | ............. | G06F 11/3414 709/224 |
| 2008/0271038 A1 * | 10/2008 | Rolia | ............. | G06F 9/505 718/105 |
| 2009/0248611 A1 * | 10/2009 | Xu | ............. | G06F 9/45558 |
| 2009/0276190 A1 * | 11/2009 | Bell, Jr | ............. | G06F 30/33 703/1 |
| 2010/0325394 A1 * | 12/2010 | Golla | ............. | G06F 9/3851 712/208 |

(Continued)

*Primary Examiner* — Qing Chen
(74) *Attorney, Agent, or Firm* — Finnegan, Henderson, Farabow, Garrett & Dunner, LLP

(57) ABSTRACT

The present disclosure provides an apparatus for analyzing trace information. The apparatus includes one or more storage devices that store a set of instructions, and one or more processors. The one or more processors are configured to execute the set of instructions to cause the apparatus to: obtain, from servers, processor instruction traces corresponding to workloads performed by the servers; generate address traces based on the processor instruction traces; and perform a workload analysis in accordance with the address traces to model resource demands of the workloads.

18 Claims, 9 Drawing Sheets

(56) References Cited

U.S. PATENT DOCUMENTS

2013/0268940 A1* 10/2013 Gmach ................ G06F 9/5077
                                                    718/104
2016/0011872 A1*  1/2016 Opferman ........... G06F 9/30145
                                                    712/226
2016/0062795 A1*  3/2016 Hu ....................... H04L 47/805
                                                    718/104

* cited by examiner

| Code Snippet 510 | | Memory Address Access Pattern 520 | | |
|---|---|---|---|---|
| | | Type | Address | Address | Address |
| 1: | mov rax, [rsp+0xc0] | 1: R | 0x0c0 | 0x1c0 | 0x1c0 |
| 2: | mov r8d, [rax] | 2: R | 0x000 | 0x000 | 0x100 |
| 3: | test r8d, r8d | 4: R | 0x074 | 0x174 | 0x174 |
| 4: | jle 0x102 | 4: W | 0x074 | 0x174 | 0x174 |
| 5: | add [rsp+0x74], 0x1 | 7: R | 0x0c0 | 0x1c0 | 0x1c0 |
| 6: | add r9, 0x144 | 7: W | 0x0c0 | 0x1c0 | 0x1c0 |
| 7: | add [rsp+0xc0], 0x144 | 8: R | 0x050 | 0x150 | 0x150 |
| 8: | add [rsp+0x50], 0x144 | 8: W | 0x050 | 0x150 | 0x150 |
| 9: | cmp r9, [rsp+0x118] | 9: R | 0x118 | 0x218 | 0x218 |
| 10: | jnz 0xfec7 | 11: R | 0x0c0 | 0x1c0 | 0x1c0 |
| 11: | mov rax, [rsp+0xc0] | 12: R | 0x144 | 0x144 | 0x244 |
| 12: | mov r8d, [rax] | 15: R | 0x074 | 0x174 | 0x174 |
| 13: | test r8d, r8d | 15: W | 0x074 | 0x174 | 0x174 |
| 14: | jle 0x102 | 17: R | 0x0c0 | 0x1c0 | 0x1c0 |
| 15: | add [rsp+0x74], 0x1 | 17: W | 0x0c0 | 0x1c0 | 0x1c0 |
| 16: | add r9, 0x144 | 18: R | 0x050 | 0x150 | 0x150 |
| 17: | add [rsp+0xc0], 0x144 | 18: R | 0x050 | 0x150 | 0x150 |
| 18: | add [rsp+0x50], 0x144 | 19: R | 0x118 | 0x218 | 0x218 |
| 19: | cmp r9, [rsp+0x118] | | | | |
| 20: | jnz 0xfec7 | | | | |

FIG. 5

APPARATUS, METHOD, AND NON-TRANSITORY COMPUTER-READABLE MEDIUM FOR ANALYZING TRACE INFORMATION

BACKGROUND

With the increasing number of applications being migrated to the cloud, modern hyper-scale datacenters are confronted with tremendous challenges in terms of scheduling, resource management, and interference isolation. Due to the nature of datacenter workloads, existing tracing tools and methods are deficient for several reasons.

Some tracing tools cause significant tracing overhead and unacceptable slowdown for the application under tracing, while other tracing tools are unable to replay the trace for performance analysis, which results in limited usage values. Accordingly, existing methods can merely achieve coarse-grain resource management or require expensive and inefficient offline profiling to perform scheduling.

SUMMARY

The present disclosure provides an apparatus for analyzing trace information. The apparatus includes one or more storage devices that store a set of instructions, and one or more processors. The one or more processors are configured to execute the set of instructions to cause the apparatus to: obtain, from servers, processor instruction traces corresponding to workloads performed by the servers; generate address traces based on the processor instruction traces; and perform a workload analysis in accordance with the address traces to model resource demands of the workloads.

The present disclosure provides a method for analyzing trace information. The method for analyzing trace information includes obtaining, from servers, processor instruction traces corresponding to workloads performed by the servers; generating address traces based on the processor instruction traces; and performing a workload analysis in accordance with the address traces to model resource demands of the workloads.

The present disclosure provides a non-transitory computer-readable medium that stores a set of instructions that is executable by one or more processors of an apparatus to cause the apparatus to perform a method for analyzing trace information. The method for analyzing trace information includes obtaining, from servers, processor instruction traces corresponding to workloads performed by the servers; generating address traces based on the processor instruction traces; and performing a workload analysis in accordance with the address traces to model resource demands of the workloads.

The present disclosure provides a method for workload scheduling. The method for workload scheduling includes obtaining processor instruction traces corresponding to workloads performed by servers; generating address traces based on the processor instruction traces; generating workload characteristics based on the address traces; and scheduling an incoming workload based on the workload characteristics.

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 a diagram illustrating a code snippet including instructions and a memory address access pattern of executing the instructions, consistent with embodiments of the present disclosure.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In modern hyper-scale datacenters, tracing is an important meaning to obtain and derive workload characteristics, and thereby perform resource partition and isolation and allocate hardware resources accordingly for the incoming workloads. Some conventional tracing technologies cause tens to hundreds of times slowdown for the application, which may ripple through related workloads and cause an abnormal system behavior. Another problem of some conventional tracing technologies is that collected traces do not contain data used by the instructions, and thus these traces are unable to be replayed for further performance analysis. In the absence of efficient online tracing, conventional scheduling methods typically require a dedicated offline cluster to mimic the online workload behavior and profile various workload combinations with different resource allocation, which is both costly and time-consuming.

Embodiments of the present disclosure mitigate at least one of the problems stated above using a light-weighted tracing tool combining with an offline trace analysis tool. Using synthetic data, the workload characteristics and behaviors can be reconstructed from instruction traces obtained from the light-weighted tracing tool for analysis. Thus, systems can achieve a low overhead (e.g., less than 15% overhead) and avoid heavy slowdown. In addition, by using an offline machine for trace analysis and the resource demands modeling, it is unnecessary to build a dedicated offline cluster for workload profiling. Accordingly, shortcomings of the current tracing technologies can be overcome by embodiments of the present disclosure.

Figure 1:
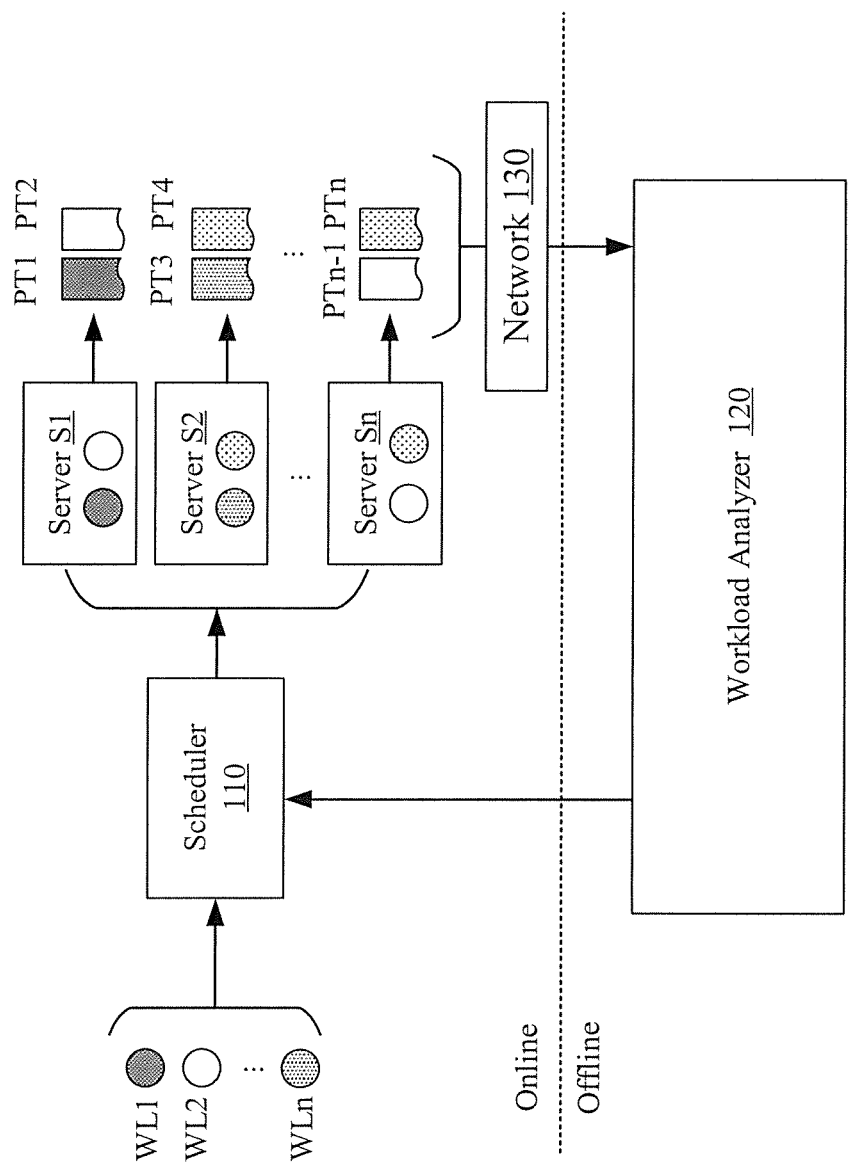
FIG. 1 is a schematic diagram illustrating an exemplary scheduling framework for a datacenter, consistent with embodiments of the present disclosure.

Reference is made to FIG. 1, which is a schematic diagram illustrating an exemplary scheduling framework for a datacenter in accordance with some embodiments of the present disclosure. In general, large-scale datacenters (DCs) host tens of thousands of diverse applications on a daily basis. As shown in FIG. 1, a system 100 of the datacenter includes a scheduler 110, a workload analyzer 120, and a plurality of servers S1-Sn. The datacenter can include various server clusters, such as file server clusters, Web server clusters, application server clusters, management server clusters, and list server clusters. Any of the clusters include several servers, with a large data volume transmitting among themselves.

In some embodiments, the scheduler 110 is configured to perform a scheduling process to arrange and move incoming workloads to certain nodes (e.g., different servers) in the clusters. In addition, resource allocation related meta data may also be carried to partition shared hardware resources, such as cores, Last Level Cache (LLC), memory and I/O, etc., based on the characteristics of the workloads, so as to allocate these hardware resources carefully and to minimize the interference among collocated workloads. Accordingly, by scheduling the workloads and performing resource allocation, the system 100 can achieve fast execution, high resource utilization of the servers, and performance isolation.

Workloads (e.g., workloads WL1-WLn in FIG. 1) in the datacenter may appear as inter-dependent micro-services or applications running in the cluster, such as searching, running a multi-threaded database engine (e.g., MySQL), etc., but the present disclosure is not limited thereto.

Various online tracing technologies are developed to capture information at the instruction level while the application is running online to obtain a trace. The information contained in the trace can be used for later analysis without re-running the application. For example, as shown in FIG. 1, the datacenter may apply hardware-assisted tracing technologies, such as a Processor Trace (PT) or a Real Time Instruction Trace (RTIT) to track results of the dynamic branch instructions corresponding to the workloads WL1-WLn to obtain processor instruction traces PT1-PTn.

The workload analyzer 120 is an apparatus for analyzing trace information. The workload analyzer 120 can communicate with online servers S1-Sn through network 130. The workload analyzer 120 is configured to receive the processor instruction traces PT1-PTn and analyze characteristics of the workloads based on the processor instruction traces PT1-PTn. In addition, the workload analyzer 120 may also provide information for the scheduler 110 to perform scheduling and resource allocation in order to optimize the utilization of the servers S1-Sn in the datacenter.

In this framework, the workload analyzer 120 is configured to decouple the online instruction traces from the data traces and perform the analysis offline by using synthetic data to reconstruct the memory access pattern. Based on the analyzed results, the fine-grain resource allocation policies can be derived for online scheduling. Thus, the system 100 can achieve scheduling, fine-grain resource allocation and performance interference isolation without the need of a dedicated cluster to perform offline profiling. Accordingly, with an increasing number of applications being migrated to the cloud, the workload analyzer 120 can characterize workloads in the cloud and provide an efficient and cost-effective scheduling.

Figure 2:
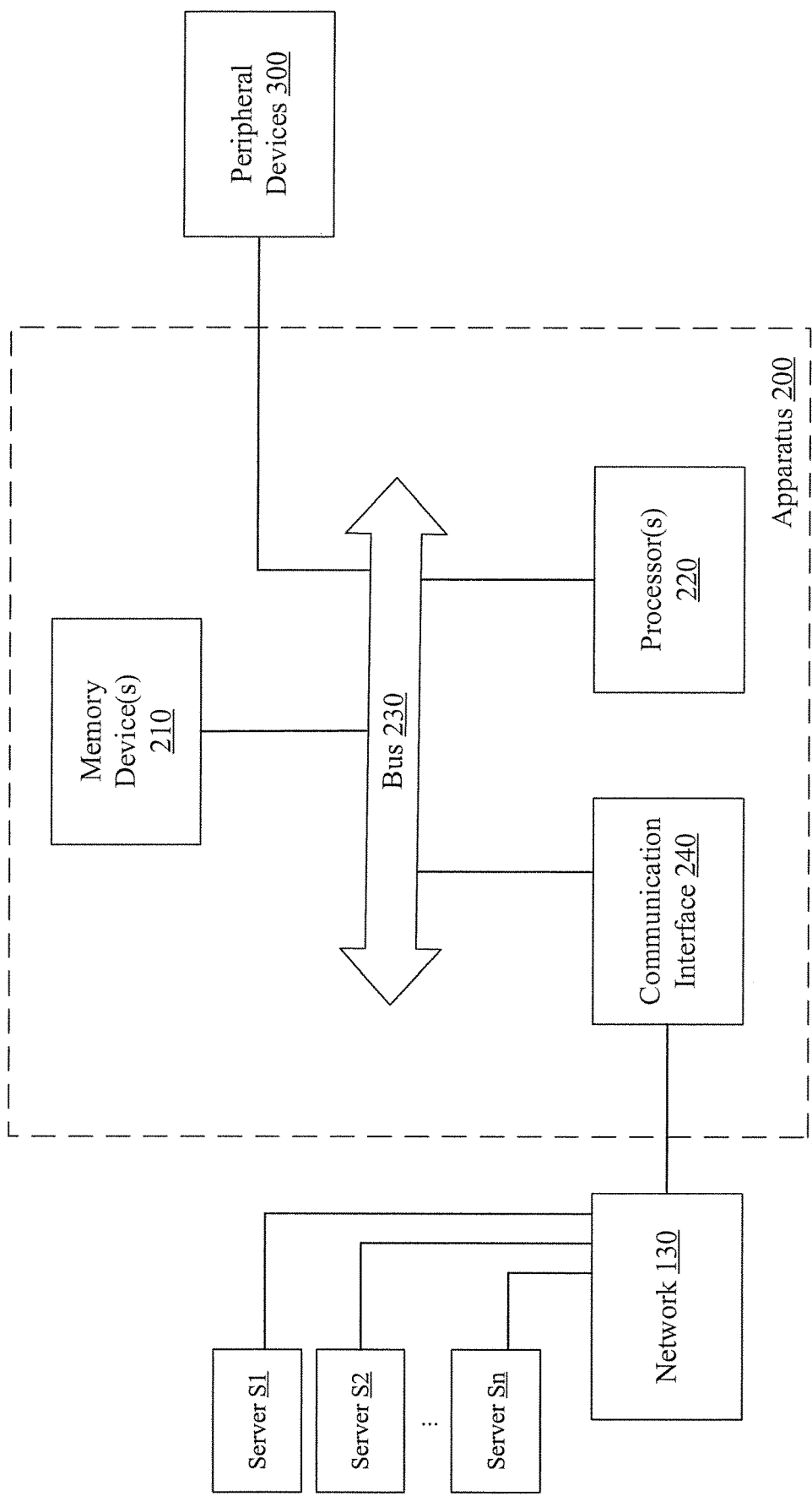
FIG. 2 is a schematic diagram illustrating an exemplary apparatus for analyzing trace information, consistent with embodiments of the present disclosure.

FIG. 2 is a schematic diagram illustrating an exemplary apparatus 200 for analyzing trace information in accordance with some embodiments of the present disclosure. In some embodiments, the apparatus 200 may be an offline server to implement the workload analyzer 120 shown in FIG. 1 but is not limited thereto. According to FIG. 2, apparatus 200 includes a bus 230 or other communication mechanism for communicating information, and one or more hardware processors 220 communicatively coupled with bus 230 for processing information. Hardware processors 220 can be, for example, one or more central processors or microprocessors.

Apparatus 200 further includes one or more storage devices 210, which may include random access memory (RAM), read only memory (ROM), and data storage systems comprised of partitions. Storage devices 210 can be communicatively coupled with processors 220 via bus 230. Storage devices 210 may include a main memory, which can be used for storing temporary variables or other intermediate information during execution of instructions by processors 220. Such instructions, after being stored in non-transitory storage media accessible to processors 220, render apparatus 200 into a special-purpose machine that is customized to perform operations specified in the instructions.

Apparatus 200 can transmit data to or communicate with online servers S1-Sn through network 130. Network 130 can be a local network, an internet service provider, internet, or any combination thereof. Communication interface 240 of apparatus 200 is connected to network 122. In addition, apparatus 200 can be coupled via bus 230 to one or more peripheral devices 300, which includes displays (e.g., cathode ray tube (CRT), liquid crystal display (LCD), touch screen, etc.) and input devices (e.g., keyboard, mouse, soft keypad, etc.).

Apparatus 200 can be implemented using customized hard-wired logic, one or more ASICs or FPGAs, firmware, or program logic that in combination with the server causes apparatus 200 to be a special-purpose machine.

The term "non-transitory media" as used herein refers to any non-transitory media storing data or instructions that cause a machine to operate in a specific fashion. Such non-transitory media can comprise non-volatile media and/or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processors 220 for execution. For example, the instructions can initially be carried out on a magnetic disk or solid-state drive of a remote computer. The remote computer can load the instructions into its dynamic memory and send the instructions over a telephone line using a modem. A modem local to apparatus 200 can receive the data on the telephone line and use an infra-red transmitter to convert the data to an infra-red signal. An infra-red detector can receive the data carried in the infra-red signal and appropriate circuitry can place the data on bus 230. Bus 230 carries the data to the main memory within storage devices 210, from which processors 220 retrieves and executes the instructions. Alternatively stated, storage devices 210 can store a set of instructions, and processors 220 can be configured to execute the set of instructions to cause the apparatus 200 to analyze trace information.

Figure 3:
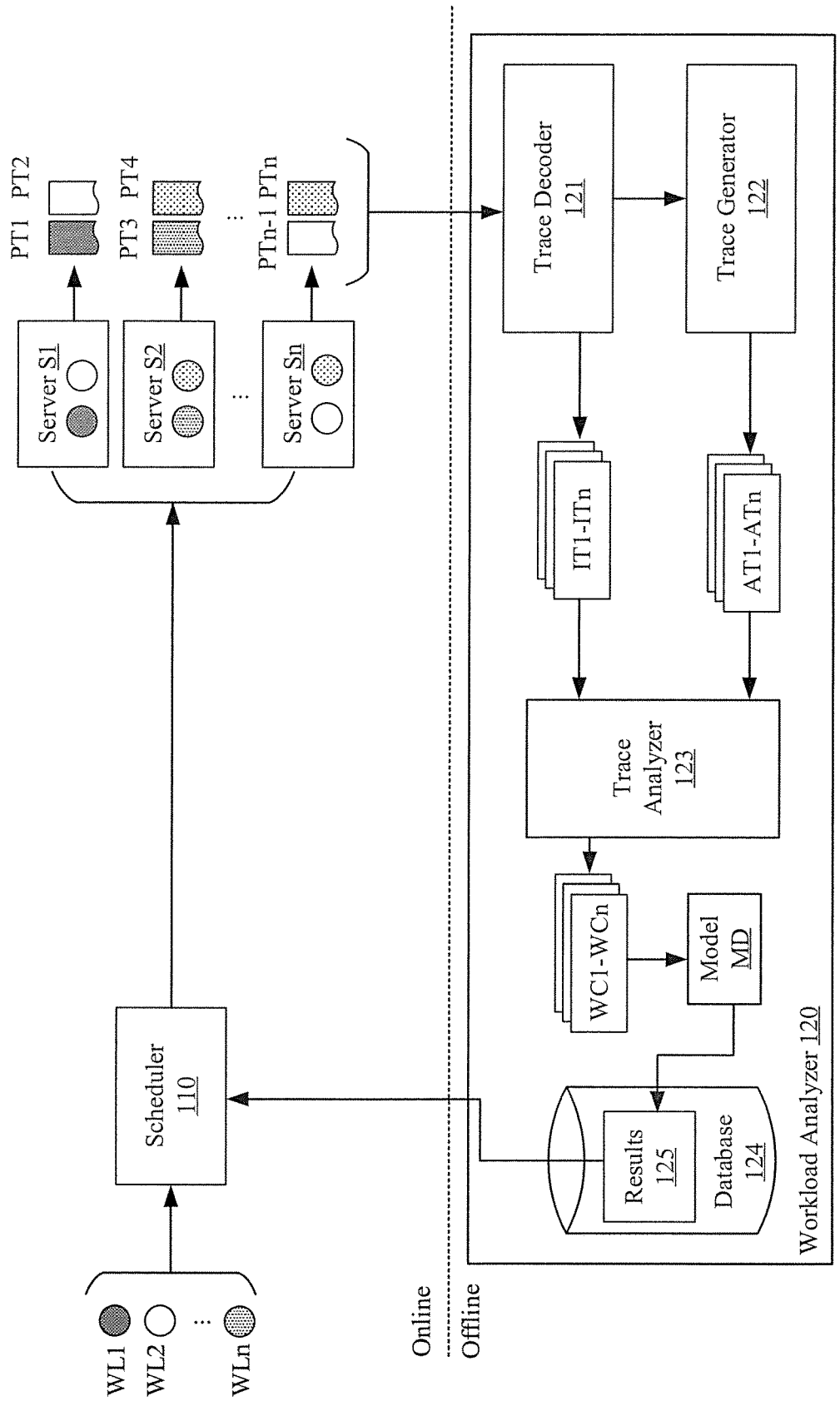
FIG. 3 is a schematic diagram illustrating exemplary operations of a workload analyzer, consistent with embodiments of the present disclosure.

Reference is made to FIG. 3, which is a schematic diagram illustrating exemplary operations of the workload analyzer 120 in accordance with some embodiments of the present disclosure. As shown in FIG. 3, in some embodiments, the workload analyzer 120 includes a trace generator 122 and a trace analyzer 123.

The trace generator 122 is configured to obtain, from servers S1-Sn, multiple processor instruction traces PT1-PTn corresponding to workloads WL1-WLn performed by the servers S1-Sn and generate corresponding address traces AT1-ATn based on the processor instruction traces PT1-PTn. In some embodiments, the address traces AT1-ATn are synthetic address traces reconstructed by using synthetic data. The address traces AT1-ATn include memory access information, which may include the memory access address and the size of the access. In some embodiments, the trace generator 122 is also configured to generate decoded instruction traces IT1-ITn corresponding to the workloads WL1-WLn based on the processor instruction traces PT1-PTn, but the present disclosure is not limited thereto. In some other embodiments, the decoded instruction traces IT1-ITn can be generated independently and consumed by the trace generator 122 or the trace analyzer 123 directly.

Accordingly, the trace analyzer 123 can perform the workload analysis in accordance with the address traces AT1-ATn and the decoded instruction traces IT1-ITn to model resource demands of the workloads WL1-WLn. In the workload analysis process, the trace analyzer 123 is configured to obtain workload characteristics WC1-WCn corresponding to workloads WL1-WLn in accordance with the address traces AT1-ATn and the decoded instruction traces IT1-ITn and to apply a model MD for evaluating performance of the workloads WL1-WLn under different configurations (e.g., resource allocation configurations) in accordance with the workload characteristics WC1-WCn to obtain results 125 associated with the configurations. In some embodiments, the workload characteristics WC1-WCn generated by the trace analyzer 123 can include a stack distance profile (SDP), an instruction-level parallelism (ILP), or any combinations thereof, which will be further discussed in later paragraphs. The trace analyzer 123 can also perform various analyses to obtain other metrics as the workload characteristics to describe and identify the workload's behaviors, and the SDP and ILP mentioned above are merely by examples and are not meant to limit the present disclosure.

As shown in FIG. 3, the results 125 obtained by the model MD and the recommended resource allocation policies can be accumulated in a database 124 in the workload analyzer 120. Thus, the scheduler 110 online can query the results 125 in the database 124 when the scheduler 110 identifies a recurrent incoming workload and can schedule the incoming workload to the servers S1-Sn with the recommended resource allocation policy. That is, the workloads assigned to the servers S1-Sn can be scheduled by the scheduler 110 in accordance with the workload analysis.

That is, the trace analyzer 123 can reconstruct the program behavior and workload characteristics using synthetic data, and then use the reconstructed workload characteristics for fine-grain resource demand modeling. Thus, the modeled results may be used to guide the scheduler 110 to allocate an incoming workload to the servers and perform workload scheduling accordingly. In view of above, by scheduling one or more incoming workloads based on the reconstructed workload characteristics, a method for workload scheduling can be achieved by the scheduler 110 and the workload analyzer 120. It is appreciated that various tools and models may be used to realize the trace analyzer 123, and thus further explanation is omitted for the sake of brevity.

Figure 4:
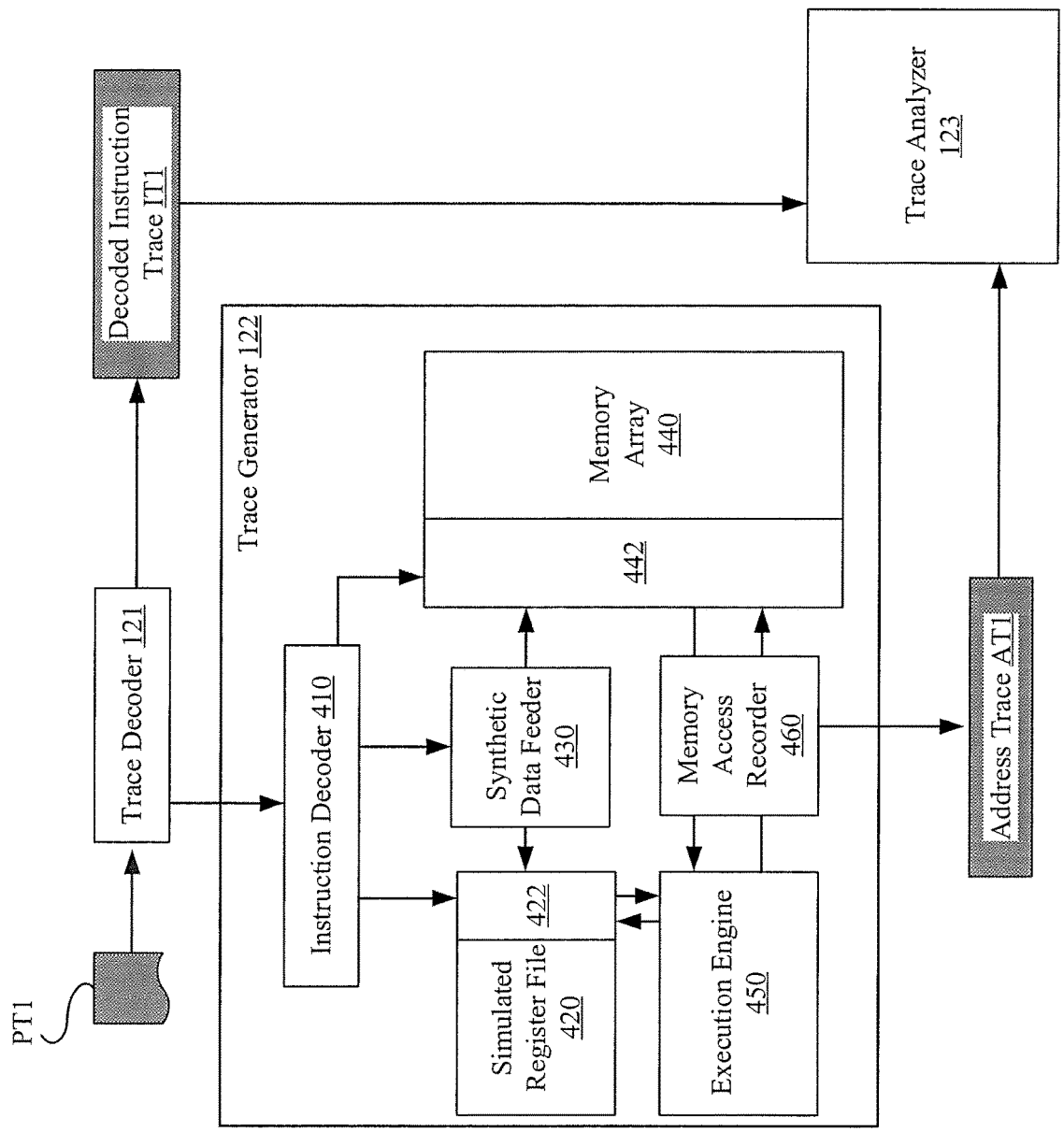
FIG. 4 is a schematic diagram illustrating an exemplary structure of a trace generator, consistent with embodiments of the present disclosure.

The generation of the address traces AT1-ATn performed by the trace generator is elaborated on in FIG. 4. FIG. 4 is a schematic diagram illustrating the structure of the trace generator 122 in accordance with some embodiments of the present disclosure. As shown in FIG. 4, the trace generator 122 includes an instruction decoder 410, a simulated register file 420, a synthetic data feeder 430, a memory array 440, an execution engine 450, and a memory access recorder 460.

As shown in FIG. 4, in some embodiments, the collected processor instruction trace PT1 is first fed into the trace decoder 121. The trace decoder 121 is configured to decode the data and generate an instruction stream including instructions in the corresponding workload. In some embodiments, the trace decoder 121 is also configured to generate the decoded instruction trace in accordance with the processor instruction trace PT1. In some other embodiments, the instruction decoder 410 in the trace generator 122 is configured to generate the decoded instruction trace n accordance with the instruction stream decoded by the trace decoder 121.

The instruction decoder 410 is configured to decode a current instruction in the instructions to obtain one or more operands in the current instruction. For example, in an x86 architecture, an x86 instruction decoder decodes the instructions and bypasses the conditional branch instructions, such as JMP and Jcc instructions without emulation. On the other hand, the CALL/RET instructions, which involve pushing/popping EIP and/or CS registers in/out of the memory stack, are still captured.

After the instruction decoder 410 decodes the current instruction, the trace generator 122 determines whether the operands are accessed for a first time. The operands may include one or more registers, such as general-purpose registers (GPRs) and vector registers in a simulated register file 420, and one or more memory addresses in the memory array 440 accessed in the current instruction.

For the register operands, the trace generator 122 accesses the simulated register file 420 via a corresponding simulated register file wrapper 422 based on the register, and determines whether the register is accessed for the first time by the simulated register file wrapper 422. If the register is read for the first time, the simulated register file wrapper 422 is configured to access the synthetic data feeder 430 and use the value from the synthetic data feeder 430 to write to the register before the execution engine 450 emulates the execution. On the other hand, if the register has been accessed before, the value in the register can be supplied to the execution engine 450 for the execution.

Similarly, for the memory operands, when the instruction requires memory access for the data, the memory access wrapper 442 of the memory array 440 can also determine whether the memory address is accessed for the first time and use the value from the synthetic data feeder 430 to write to the corresponding memory address being accessed for the first time. Thus, an initial value is assigned to the register or the memory address during the first access, and the execution engine 450 can emulate and execute the instructions using the supplied operand values correspondingly, and write the outcome result back to the register or the memory array 440. Alternatively stated, the operand values can be updated according to the execution of the current instruction.

During the emulated execution, the memory access recorder 460 is configured to communicate with the memory array 440 and the execution engine 450 to keep track of the memory accesses in the form of the address trace. Thus, the trace generator 122 can generate synthetic address traces AT1-ATn by supplying synthetic data, rather than counting on full data traces. That is, data used to generate address traces AT1-ATn is decoupled from the processor instruction traces PT1-PTn, and the address traces AT1-ATn may be further analyzed in the following process.

Reference is made to FIG. 5 for better understanding of how the program behavior and workload characteristics are reconstructed using synthetic data. FIG. 5 is a diagram illustrating a code snippet 510 including instructions and a memory address access pattern 520 of executing the instructions. As shown in the figure, in the code snippet 510, some of the memory addresses are generated using RSP register with a displacement, and one memory reference uses RAX register value as its address. If different initial value combinations of RSP and memory address of RAX are supplied when executing the code snippet 510, it can be observed that while the address traces are different in each execution, the reuse pattern of each memory address remains the same.

For instance, the address 0x0c0 in the first trace is reused after three memory references, followed by a reuse distance of 0, 3, 3, and 0. Similarly, the address 0x1c0 in the other two traces also has the same reuse pattern. The memory reuse pattern is fundamentally determined by the outcomes and occurrence orders of the instructions, e.g., the control flow of the code, during the execution of the application. As long as the dynamic code sequence is captured, the data has minimal impact on the memory access pattern.

Accordingly, while the actual address traces vary in accordance with the data, some features and behaviors of the workload are insensitive to the data, and thus can be reconstructed using the synthetic data. For instance, a stack distance may refer to the number of memory accesses in between any two consecutive memory accesses to the same memory address. A stack distance histogram is a useful workload characteristic that captures the data reuse pattern as well as the working set size of the workload. Since the reuse pattern in the synthetic address trace remains the same, the trace analyzer 123 can analyze the address trace to obtain the stack distance histogram without requiring the full data trace.

For better understanding of how memory access pattern is imprinted in the code sequence and thereby can be recovered by synthetic data, the instructions in the code snippet 510 will be discussed as an example. In general, data in the program fulfill three purposes including plain value calculation, memory addresses, and instruction control flow manipulation, which will be discussed in the following paragraphs.

In the code snippet 510, the instruction 16 (i.e., "add r9, 0x144") is an example of plain value calculation. This type of instruction performs arithmetic or move operations on immediate data or register values without later memory accesses. Therefore, these types of instructions have no immediate consequences on the memory accesses.

In addition, instruction 13 (i.e., "test r8d, r8d"), instruction 14 (i.e., "jle 0x102"), instruction 19 (i.e., "cmp r9, [rsp+0x188]"), and instruction 20 (i.e., "jnz 0xfec7") are examples where data are used for control flow manipulation. The data influences the EFLAGS registers through TEST or CMP instruction, and consequently changes the outcomes of the following branch instruction. However, since the instruction control flow is hardened in the instruction trace and is not altered during replay, these instructions do not affect memory accesses.

Furthermore, the instruction 11 (i.e., "mov rax, [rsp+0xc0]"), instruction 12 (i.e., "mov r8d, [rax]"), instruction 15 (i.e., "add [rsp+0x74], 0x1"), instruction 17 (i.e., "add [rsp+0xc0], 0x144"), instruction 18 (i.e., "add [rsp+0x50], 0x144"), and instruction 19 (i.e., "cmp r9, [rsp+0x188]") are examples where data are used as addresses of memory accesses. Specifically, depending on the layout of the code, the memory accesses can lead to three types of access patterns, namely, reuse pattern, stride pattern, and pointer reference pattern.

For the reuse pattern, the memory access is completely determined by the code sequence, and data have no impact on it. For the stride pattern, the memory access may be data independent for the case where the stride is a constant value. But it is also possible that the stride is data dependent. For the pointer reference pattern, the value of an earlier memory access is used as the address of following memory access. Therefore, the data could affect which memory location to be accessed hence the number of pages touched, albeit the fact that it is pointer-chasing pattern does not change.

For various workloads, a majority of memory accesses demonstrate reuse pattern or stride pattern, with the percentage of pointer reference pattern less than 30%. In other words, most of the access patterns are preserved in the instruction trace and insensitive to the data variation.

In view of above, the accuracy of the instruction trace is sufficient to preserve workload characteristics, such as the stack distance profile and instruction-level parallelism, for the later analysis performed by the trace analyzer 123, despite some data sensitive information may not be completely recovered.

Furthermore, in some embodiments, a soft thresholding technique may be applied in the trace analyzer. In x86 instruction set architecture (x86 ISA), the control flow may leak via conditional move operation or an REP prefix. The REP prefix allows one instruction to be expanded multiple times when executed, according to the value in ECX register and the related conditional flags. Therefore, the value in ECX register determines the number of times the instruction occurs in the execution flow. Specifically, in some embodiments, when the value in ECX register is larger than a given threshold, it is assigned with the value of a Gaussian random variable $N(u, \sigma)$, in which u denotes the threshold value, and a denotes a quarter of the delta between ECX value and the given threshold.

The address trace contains more address entries that demonstrate stride/streaming access pattern if the value in ECX register is much larger than it should be in the original data input. Under such condition, the memory access pattern observed by the trace analyzer 123 may be noticeably altered. Furthermore, the streaming access may trespass into memory region not intended for the use by the instruction with a large value in ECX register. Accordingly, by limiting the value in ECX register with the Gaussian random variable $N(u, \sigma)$, the access pattern deviation can be limited and memory region trespassing is avoided.

Figure 6:
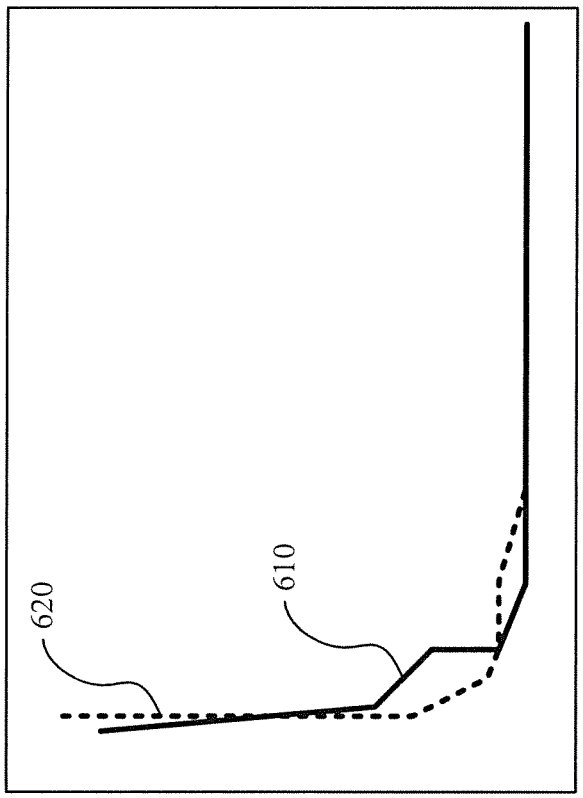
FIG. 6 and FIG. 7 are diagrams illustrating exemplary stack distance profiles (SDPs) for different workloads, consistent with embodiments of the present disclosure.
Figure 7:
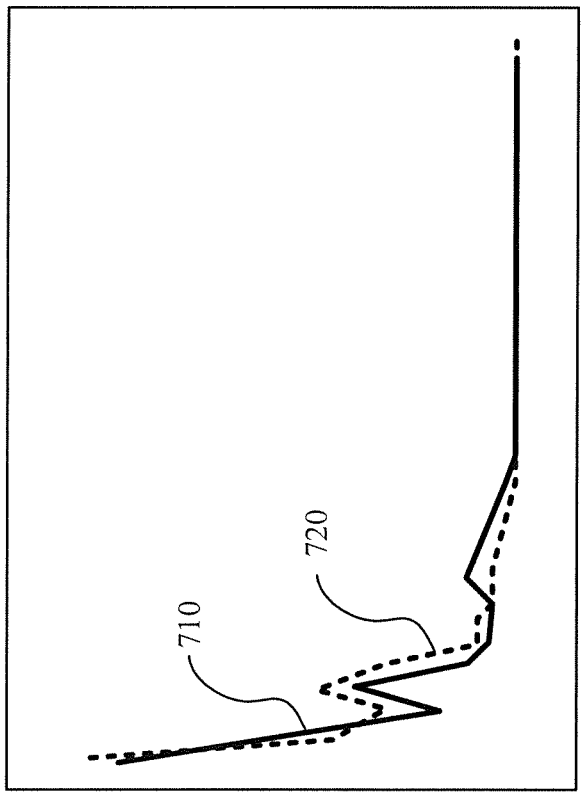

Reference is made to FIG. 6 and FIG. 7, which are diagrams illustrating exemplary stack distance profiles (SDPs) for different workloads. In FIG. 6 and FIG. 7, the x-axis denotes a log 2 of the stack distance, and the y-axis denotes a number of accesses. Curves 610, 710 respectively indicate the SDPs for running a multi-threaded database engine (e.g., MySQL) and for searching, which are generated from the synthetic address traces. Curves 620, 720 respectively indicate the corresponding SDPs generated from a SDE trace, which incurs significant tracing overhead and causes slowdown on the applications under tracing. As shown in these figures, the SDPs generated from the synthetic address traces match well with the overall shape of the corresponding SDPs from the SDE trace. In some embodiments, while varying in different workloads, the coefficient of a determination is at least greater than about 0.8, which indicates that SDPs generated from the synthetic address traces preserve the actual behavior of the program executed online.

Figure 8:
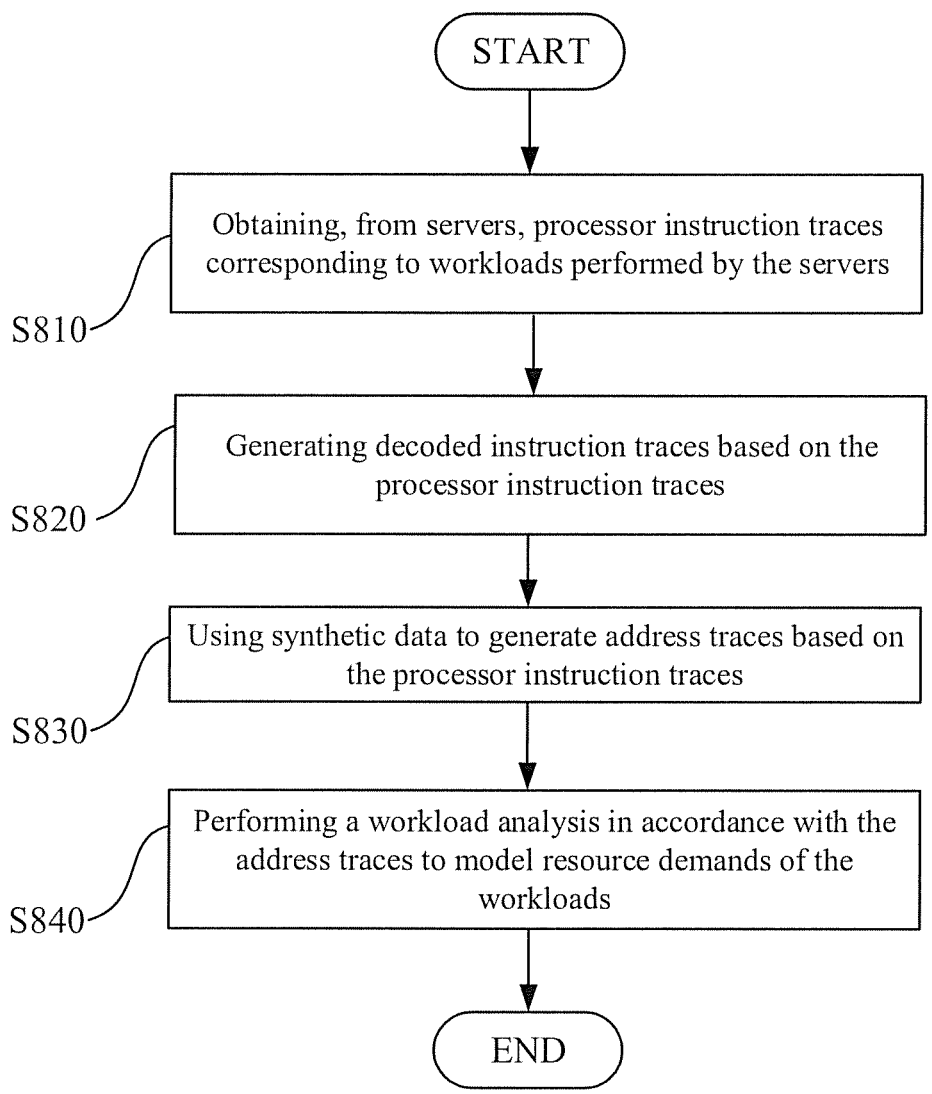
FIG. 8 illustrates a flow diagram of an exemplary method for analyzing trace information, consistent with embodiments of the present disclosure.

FIG. 8 illustrates a flow diagram of an exemplary method 800 for analyzing trace information, consistent with embodiments of the present disclosure. Method 800 can be performed by an apparatus for analyzing trace information (e.g., workload analyzer 120). The apparatus for analyzing trace information can communicate with multiple servers (e.g., servers S1-Sn of FIG. 1), and a scheduler (e.g., the scheduler 110 in FIG. 1).

In step 810, the apparatus for analyzing trace information obtains, from multiple servers (e.g., servers S1-Sn of FIG. 1), processor instruction traces corresponding to workloads running on the servers. In some embodiments, the processor instruction traces are collected from the online servers by a tracing tool, such as Processor Trace (PT) or Real Time Instruction Trace (RTIT). For example, a PT agent can be deployed in the servers in the datacenter. The PT agent is invoked on-demand to collect the processor instruction traces (e.g., PT trace) for the corresponding workloads scheduled to the servers. The collected processor trace can be transferred to the workload analyzer in an offline server in the background when the network traffic is light.

In step 820, the apparatus for analyzing trace information generates the decoded instruction traces (e.g., decoded instruction traces IT1-ITn in FIG. 3) based on the processor instruction traces. In some embodiments, a trace decoder (e.g., trace decoder 121 in FIG. 3) receives the processor instruction traces and generates the decoded instruction traces accordingly.

In step 830, the apparatus for analyzing trace information uses synthetic data to generate address traces (e.g., address traces AT1-ATn in FIG. 3) based on the processor instruction traces (e.g., processor instruction traces PT1-PTn in FIG. 3). Thus, the address traces are generated in a decoupled way. That is, the apparatus is configured to decouple data from the instruction trace, and the address traces can be obtained without the full data traces. The address traces include memory access information corresponding to the workloads. For example, memory access information can include memory reuse patterns during the execution of the workloads.

In step 840, the apparatus for analyzing trace information performs a workload analysis in accordance with the address traces to model resource demands of the workloads. In some embodiments, a trace analyzer (e.g., trace analyzer 123 in FIG. 3) performs the workload analysis in accordance with the address trace and the decoded instruction trace together. Accordingly, the incoming workloads can be scheduled by the scheduler (e.g., scheduler 110 in FIG. 1) online according to the resource allocation derived from workload analysis.

Figure 9:
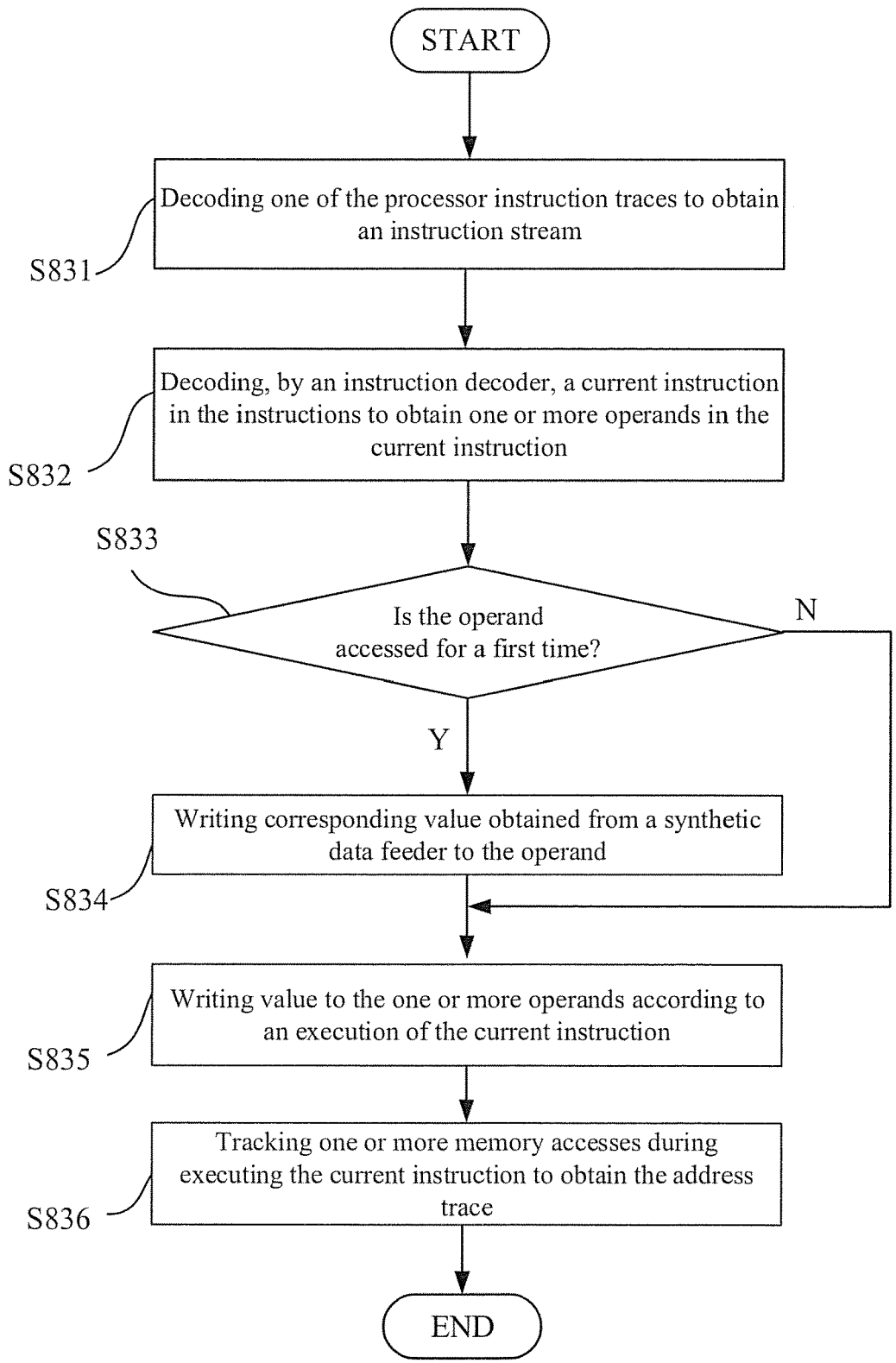
FIG. 9 illustrates a flow diagram of operations of obtaining the address traces in the exemplary method for analyzing trace information, consistent with embodiments of the present disclosure.

Reference is made to FIG. 9, which illustrates a flow diagram of operations of obtaining the address traces in step 830 in accordance with some embodiments of the present disclosure. As shown in FIG. 9, step 830 can include steps S831-S836.

In step S831, a trace decoder (e.g., trace decoder 121 in FIG. 4) decodes one of the processor instruction traces (e.g., processor instruction trace PT1 in FIG. 4) to obtain an instruction stream. The instruction stream includes instructions to be executed corresponding to the workload.

In step S832, an instruction decoder (e.g., instruction decoder 410 in FIG. 4) in the trace generator decodes a current instruction in the instructions to obtain one or more operands in the current instruction.

In step S833, the trace generator determining whether the one or more operands are accessed for a first time after decoding the current instruction. For example, the one or more operands may include one or more registers, or one or more memory addresses accessed in the current instruction. The trace generator accesses a simulated register file wrapper (e.g., simulated register file wrapper 422 in FIG. 4) to determine whether the one or more registers are accessed for the first time, and accesses a memory access wrapper (e.g., memory access wrapper 442 in FIG. 4) to determine whether the one or more memory addresses are accessed for the first time.

In step S834, responsive to a determination that the one or more operands are accessed for the first time, the trace generator writes a corresponding value obtained from a synthetic data feeder (e.g., synthetic data feeder 430 in FIG. 4) to the one or more operands. On the other hand, responsive to a determination that the one or more operands have already been accessed, step S834 is bypassed and step S835 is performed.

In step S835, the trace generator writes a value to the one or more operands according to an execution of the current instruction performed by an execution engine (e.g., execution engine 450 in FIG. 4). Alternatively stated, the execution outcome is written back in the corresponding registers or memory addresses.

In step S836, the trace generator tracks one or more memory accesses during executing the current instruction by a memory access recorder (e.g., memory access recorder 460 in FIG. 4) to obtain the address trace (e.g., address trace AT1 in FIG. 4) corresponding to the one of the processor instruction traces (e.g., processor instruction trace PT1 in FIG. 4). Thus, by steps S831-S836, the address traces can be obtained for the following analysis.

Figure 10:
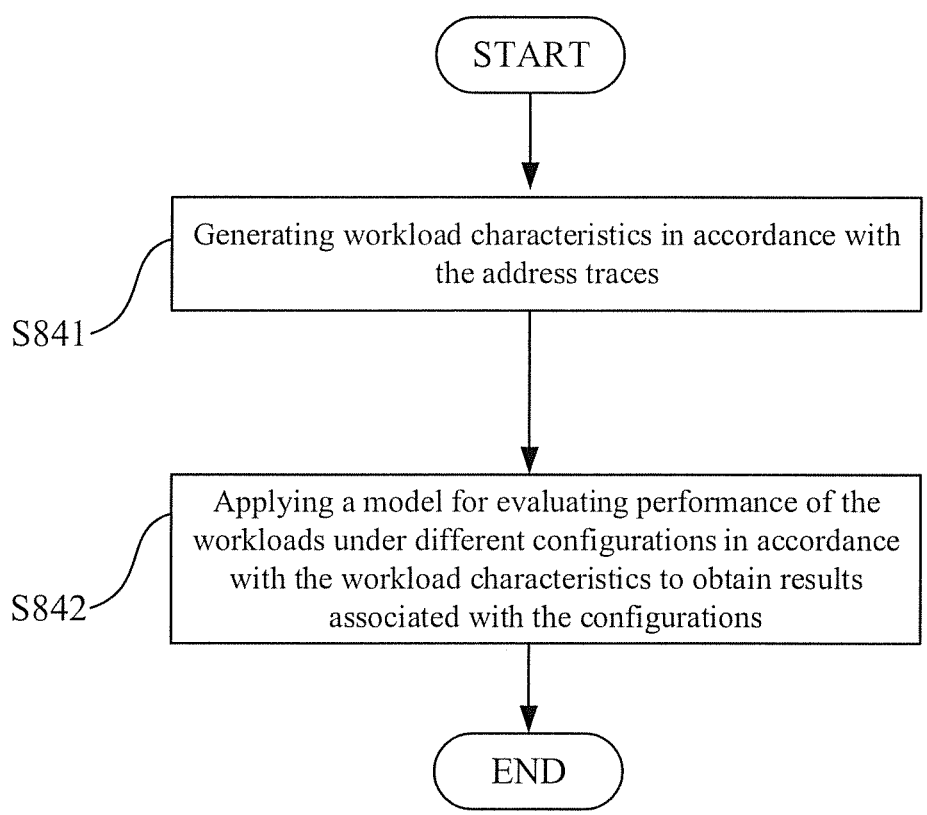
FIG. 10 illustrates a flow diagram of operations of performing the workload analysis in the exemplary method for analyzing trace information, consistent with embodiments of the present disclosure.

Reference is made to FIG. 10, which illustrates a flow diagram of operations of performing the workload analysis in step 840 in accordance with some embodiments of the present disclosure. As shown in FIG. 10, step 840 can include steps S841 and S842.

In step S841, a trace analyzer (e.g., trace analyzer 123 in FIG. 3) generates workload characteristics (e.g., workload characteristics WC1-WCn in FIG. 3) corresponding to the workloads in accordance with the address traces. In some embodiments, the trace analyzer further generates the workload characteristics in accordance with the address traces and the decoded instruction traces together. For example, the workload characteristics may include a stack distance profile, an instruction-level parallelism, or any combinations thereof, but the present disclosure is not limited thereto.

In step S842, the trace analyzer applies a model (e.g., model MD in FIG. 3) for evaluating performance of the workloads in accordance with the workload characteristics to obtain results associated with the configurations. For example, based on the workload characteristics obtained, the trace analyzer can provide an analytical performance model for evaluating the performance of each workload pair under various resource allocation configurations. Thus, the modeled results (e.g., results 125 in FIG. 3) can be stored in a database (e.g., database 124 in FIG. 3) and queried by the scheduler online to allocate an incoming workload to the servers. Therefore, the scheduler can perform resource management and scheduling on the datacenters and partition the shared hardware resources in the datacenter properly to minimize the interference among collocated workloads.

In view of above, in various embodiments of the present disclosure, by combining online PT tracing with offline trace analysis and decoupling data from the instruction trace, the datacenter can achieve lightweight workload tracing with little tracing overhead. The instruction traces captured from online tracing can be replayed using synthetic data to reconstruct program behaviors, and thus achieve optimal scheduling and interference isolations for applications. Furthermore, though the x86 ISA is taken as an example in the embodiments, the disclosure is not limited thereto. In some other embodiments, the workload analyzer is also applicable to other processor ISAs.

The various example embodiments described herein are described in the general context of method steps or processes, which may be implemented in one aspect by a computer program product, embodied in a transitory or a non-transitory computer-readable medium, including computer-executable instructions, such as program code, executed by computers in networked environments. A computer-readable medium may include removeable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. An apparatus for analyzing trace information, comprising:
one or more storage devices that store a set of instructions; and
one or more processors configured to execute the set of instructions to cause the apparatus to:
obtain, from a plurality of servers, a plurality of processor instruction traces corresponding to a plurality of workloads performed by the plurality of servers;
generate a plurality of address traces based on the plurality of processor instruction traces by:
decoding a processor instruction trace of the plurality of processor instruction traces to obtain an instruction stream, wherein the instruction stream comprises a plurality of instructions;
decoding a current instruction in the plurality of instructions to obtain one or more operands in the current instruction;
writing a value to the one or more operands according to an execution of the current instruction; and
tracking one or more memory accesses during executing the current instruction to generate an address trace corresponding to the processor instruction trace of the plurality of processor instruction traces; and
perform a workload analysis in accordance with the plurality of address traces to model resource demands of the plurality of workloads.

2. The apparatus for analyzing trace information of claim 1, wherein the one or more processors are further configured to execute the set of instructions to cause the apparatus to generate the plurality of address traces by:
determining whether the one or more operands are accessed for a first time after decoding the current instruction and before executing the current instruction; and
responsive to the determination that the one or more operands are accessed for the first time, writing a corresponding value obtained from a synthetic data feeder to the one or more operands.

3. The apparatus for analyzing trace information of claim 2, wherein the one or more operands comprise one or more registers or one or more memory addresses accessed in the current instruction, and wherein the one or more processors are further configured to execute the set of instructions to cause the apparatus to determine whether the one or more operands are accessed for the first time by:
accessing a simulated register file wrapper to determine whether the one or more registers are accessed for the first time; and
accessing a memory access wrapper to determine whether the one or more memory addresses are accessed for the first time.

4. The apparatus for analyzing trace information of claim 1, wherein the one or more processors are further configured to execute the set of instructions to cause the apparatus to:
generate a plurality of decoded instruction traces based on the plurality of processor instruction traces, wherein the workload analysis is further performed in accordance with the plurality of address traces and the plurality of decoded instruction traces.

5. The apparatus for analyzing trace information of claim 1, wherein the one or more processors are further configured to execute the set of instructions to cause the apparatus to perform the workload analysis by:
generating a plurality of workload characteristics corresponding to the plurality of workloads in accordance with the plurality of address traces; and
applying a model for evaluating performance of the plurality of workloads under different configurations in accordance with the plurality of workload characteristics to obtain results associated with the different configurations.

6. The apparatus for analyzing trace information of claim 5, wherein the results associated with the different configurations are used to allocate an incoming workload to the plurality of servers.

7. The apparatus for analyzing trace information of claim 5, wherein the plurality of workload characteristics include at least one of a stack distance profile or an instruction-level parallelism.

8. The apparatus for analyzing trace information of claim 1, wherein an incoming workload is scheduled according to a resource allocation derived from the workload analysis.

9. The apparatus for analyzing trace information of claim 1, wherein the apparatus for analyzing trace information is configured to generate the plurality of address traces and perform the workload analysis offline.

10. A method for analyzing trace information, comprising:
obtaining, from a plurality of servers, a plurality of processor instruction traces corresponding to a plurality of workloads performed by the plurality of servers;
generating a plurality of address traces based on the plurality of processor instruction traces by:
decoding a processor instruction trace of the plurality of processor instruction traces to obtain an instruction stream, wherein the instruction stream comprises a plurality of instructions;
decoding a current instruction in the plurality of instructions to obtain one or more operands in the current instruction;
writing a value to the one or more operands according to an execution of the current instruction; and
tracking one or more memory accesses during executing the current instruction to generate an address trace corresponding to the processor instruction trace of the plurality of processor instruction traces; and
performing a workload analysis in accordance with the plurality of address traces to model resource demands of the plurality of workloads.

11. The method for analyzing trace information of claim 10, wherein generating the plurality of address traces further comprises:
determining whether the one or more operands are accessed for a first time after decoding the current instruction and before executing the current instruction; and
responsive to the determination that the one or more operands are accessed for the first time, writing a corresponding value obtained from a synthetic data feeder to the one or more operands.

12. The method for analyzing trace information of claim 11, wherein the one or more operands comprise one or more registers or one or more memory addresses accessed in the current instruction, and wherein determining whether the one or more operands are accessed for the first time further comprises:
accessing a simulated register file wrapper to determine whether the one or more registers are accessed for the first time; and
accessing a memory access wrapper to determine whether the one or more memory addresses are accessed for the first time.

13. The method for analyzing trace information of claim 10, wherein performing the workload analysis further comprises:
generating a plurality of workload characteristics corresponding to the plurality of workloads in accordance with the plurality of address traces; and
applying a model for evaluating performance of the plurality of workloads under different configurations in accordance with the plurality of workload characteristics to obtain results associated with the different configurations, wherein the results associated with the different configurations are used to allocate an incoming workload to the plurality of servers.

14. A non-transitory computer-readable medium that stores a set of instructions that is executable by one or more processors of an apparatus to cause the apparatus to perform a method for analyzing trace information, the method for analyzing trace information comprising:
obtaining, from a plurality of servers, a plurality of processor instruction traces corresponding to a plurality of workloads performed by the plurality of servers;
generating a plurality of address traces based on the plurality of processor instruction traces by:
decoding a processor instruction trace of the plurality of processor instruction traces to obtain an instruction stream, wherein the instruction stream comprises a plurality of instructions;
decoding a current instruction in the plurality of instructions to obtain one or more operands in the current instruction;
writing a value to the one or more operands according to an execution of the current instruction; and
tracking one or more memory accesses during executing the current instruction to generate an address trace corresponding to the processor instruction trace of the plurality of processor instruction traces; and
performing a workload analysis in accordance with the plurality of address traces to model resource demands of the plurality of workloads.

15. The non-transitory computer-readable medium of claim 14, wherein the set of instructions that is executable by the one or more processors of the apparatus causes the apparatus to further perform generating the plurality of address traces by:
determining whether the one or more operands are accessed for a first time after decoding the current instruction and before executing the current instruction; and
responsive to the determination that the one or more operands are accessed for the first time, writing a corresponding value obtained from a synthetic data feeder to the one or more operands.

16. The non-transitory computer-readable medium of claim 14, wherein the set of instructions that is executable by the one or more processors of the apparatus causes the apparatus to further perform:
generating a plurality of decoded instruction traces based on the plurality of processor instruction traces, wherein the workload analysis is further performed in accordance with the plurality of address traces and the plurality of decoded instruction traces.

17. The non-transitory computer-readable medium of claim 14, wherein the set of instructions that is executable by the one or more processors of the apparatus causes the apparatus to further perform the workload analysis by:
   generating a plurality of workload characteristics corresponding to the plurality of workloads in accordance with the plurality of address traces; and
   applying a model for evaluating performance of the plurality of workloads under different configurations in accordance with the plurality of workload characteristics to obtain results associated with the different configurations, wherein the results associated with the different configurations are used to allocate an incoming workload to the plurality of servers.

18. A method for workload scheduling, comprising:
   obtaining, from a plurality of servers, a plurality of processor instruction traces corresponding to a plurality of workloads performed by the plurality of servers;
   generating a plurality of address traces based on the plurality of processor instruction traces by:
      decoding a processor instruction trace of the plurality of processor instruction traces to obtain an instruction stream, wherein the instruction stream comprises a plurality of instructions;
      decoding a current instruction in the plurality of instructions to obtain one or more operands in the current instruction;
      writing a value to the one or more operands according to an execution of the current instruction; and
      tracking one or more memory accesses during executing the current instruction to generate an address trace corresponding to the processor instruction trace of the plurality of processor instruction traces;
   generating a plurality of workload characteristics corresponding to the plurality of workloads based on the plurality of address traces; and
   scheduling an incoming workload according to a resource allocation based on the plurality of workload characteristics.

* * * * *